United States Patent
Kurihara

(10) Patent No.: US 7,886,095 B2
(45) Date of Patent: Feb. 8, 2011

(54) I/O SPACE REQUEST SUPPRESSING METHOD FOR PCI DEVICE

(75) Inventor: Katsuhide Kurihara, Kawasaki (JP)

(73) Assignee: Fujitsu Limited, Kawsaki (JP)

( * ) Notice: Subject to any disclaimer, the term of this patent is extended or adjusted under 35 U.S.C. 154(b) by 0 days.

(21) Appl. No.: 12/691,048

(22) Filed: Jan. 21, 2010

(65) Prior Publication Data

US 2010/0122009 A1 May 13, 2010

Related U.S. Application Data

(63) Continuation of application No. PCT/JP2007/000908, filed on Aug. 24, 2007.

(51) Int. Cl.
*G06F 13/00* (2006.01)
(52) U.S. Cl. .......................... 710/104; 710/9
(58) Field of Classification Search ............... 710/8–10, 710/104, 302
See application file for complete search history.

(56) References Cited

U.S. PATENT DOCUMENTS

| | | | | |
|---|---|---|---|---|
| 4,188,665 A | * | 2/1980 | Nagel et al. ................... | 710/45 |
| 5,613,162 A | * | 3/1997 | Kabenjian ..................... | 710/22 |
| 5,682,551 A | * | 10/1997 | Pawlowski et al. ............ | 710/36 |
| 6,243,773 B1 | * | 6/2001 | Mahalingam ................ | 710/302 |
| 6,536,014 B1 | * | 3/2003 | McClannahan et al. ........ | 716/1 |
| 6,704,808 B2 | * | 3/2004 | Kasamatsu et al. ............ | 710/2 |
| 7,155,379 B2 | * | 12/2006 | Oshins et al. ................. | 703/21 |

FOREIGN PATENT DOCUMENTS

| | | |
|---|---|---|
| JP | 11-288400 | 10/1999 |
| JP | 2001-256179 | 9/2001 |
| JP | 2002-32324 | 1/2002 |

* cited by examiner

*Primary Examiner*—Paul R Myers
(74) *Attorney, Agent, or Firm*—Staas & Halsey LLP

(57) ABSTRACT

To minimize the restriction on the number of available PCI devices although the assignable size of I/O space is limited, an arithmetic unit is provided with a configuration information acquisition device for acquiring the configuration information about PCI devices, an available space determination device for determining available space for each PCI device, and a configuration information notification device for notifying an operating system of the configuration information.

15 Claims, 7 Drawing Sheets

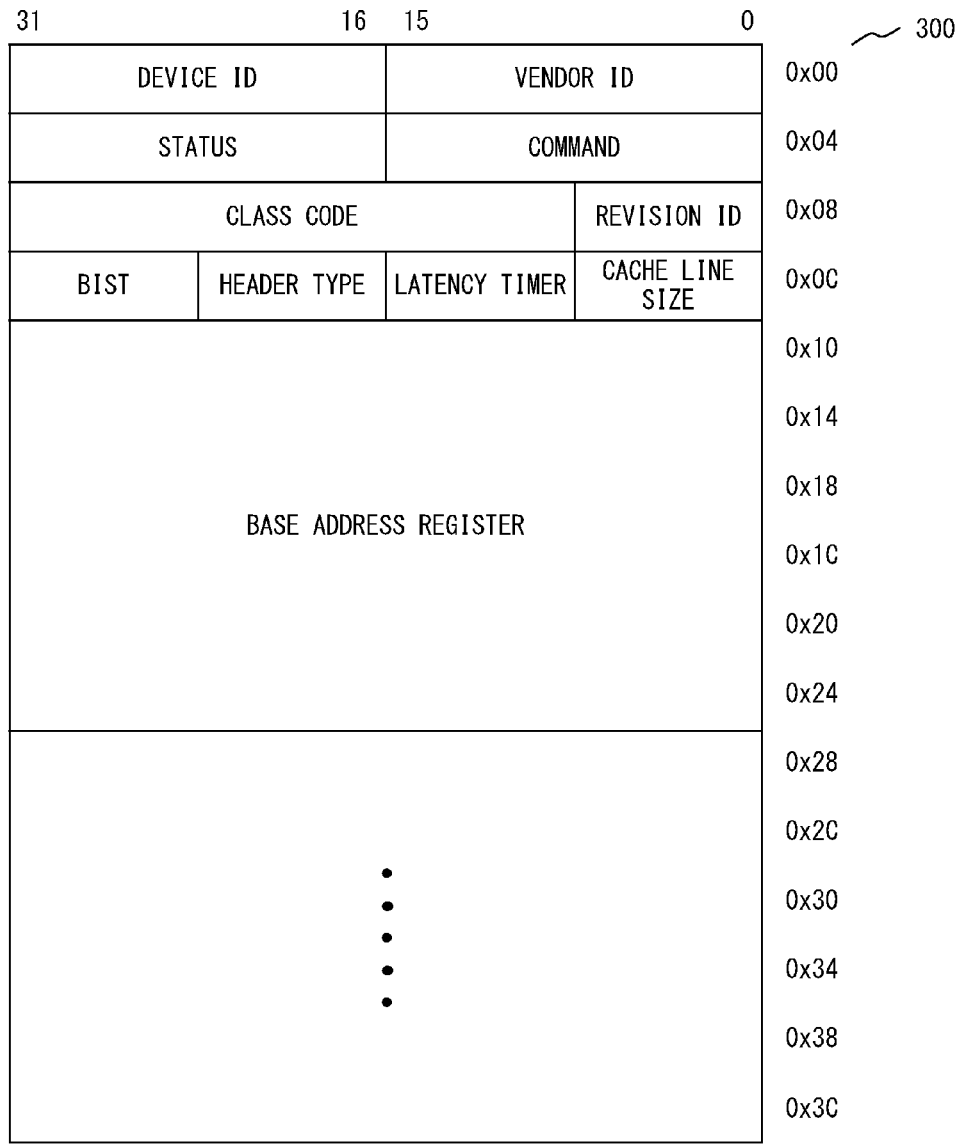
F I G. 3

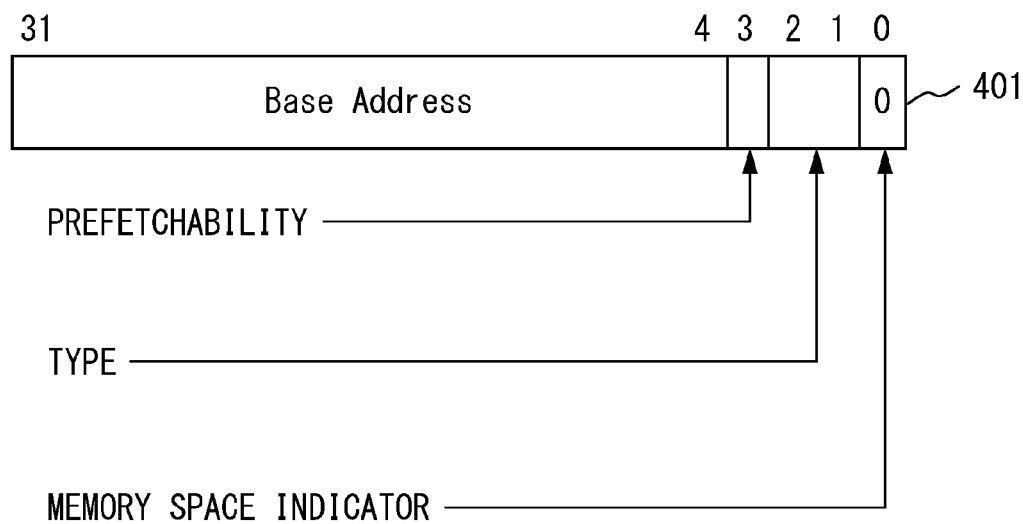
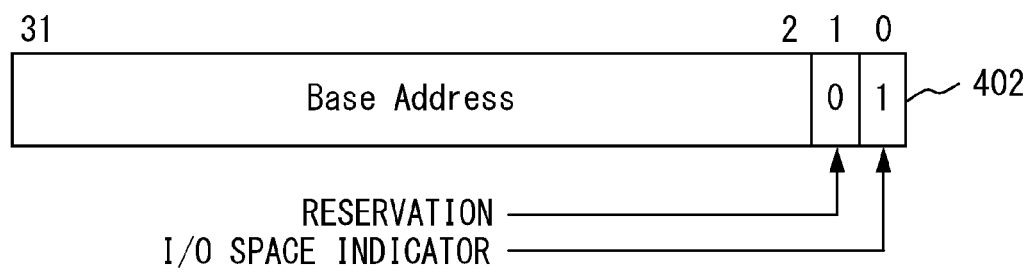
F I G. 4

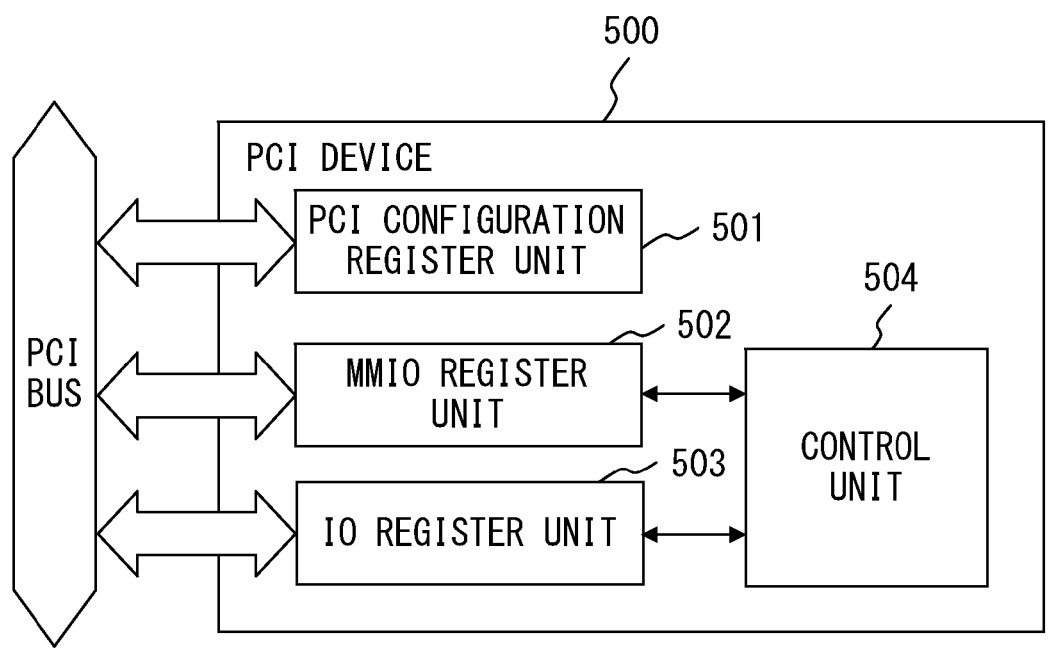
F I G. 5

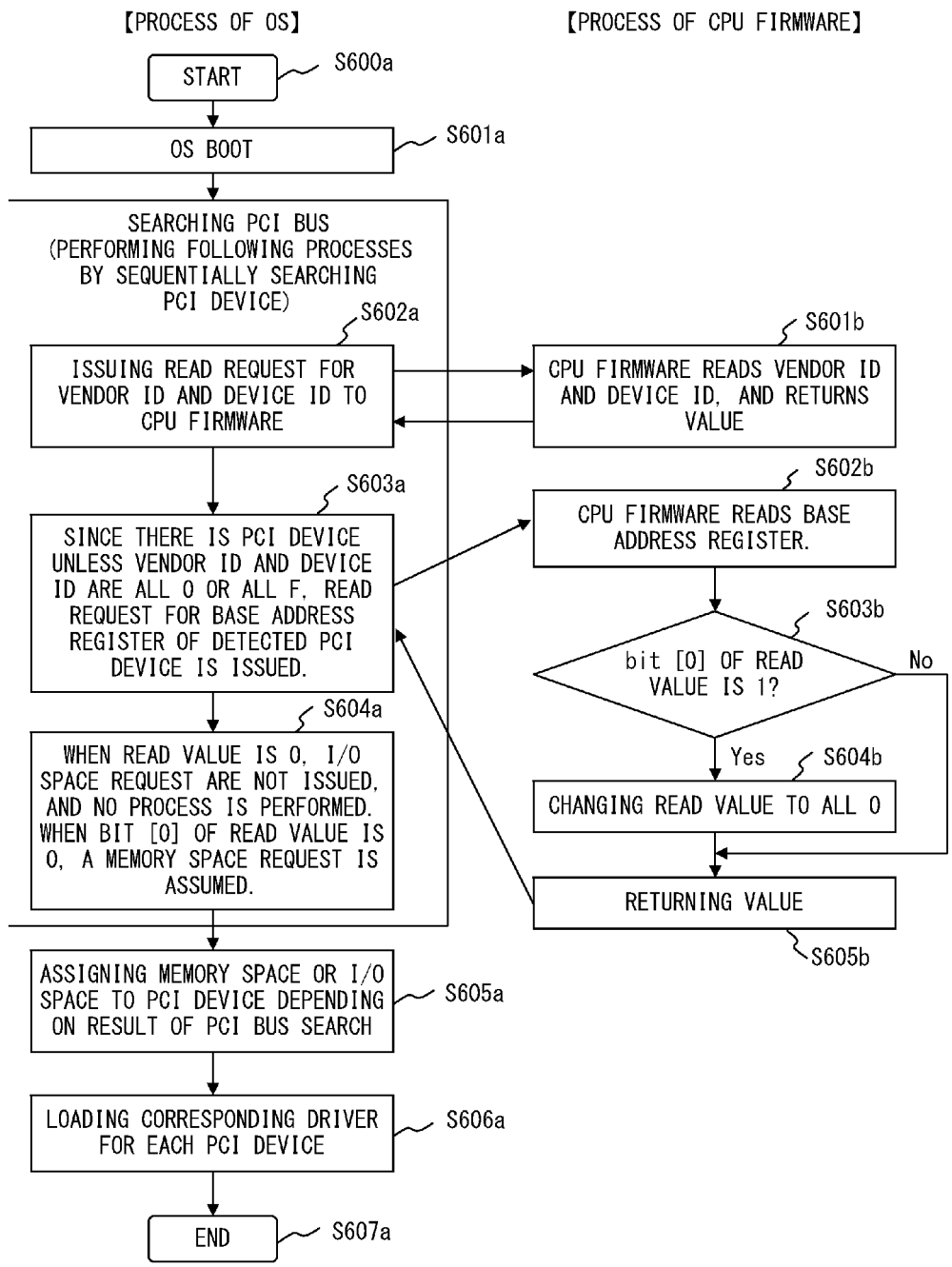
F I G. 6

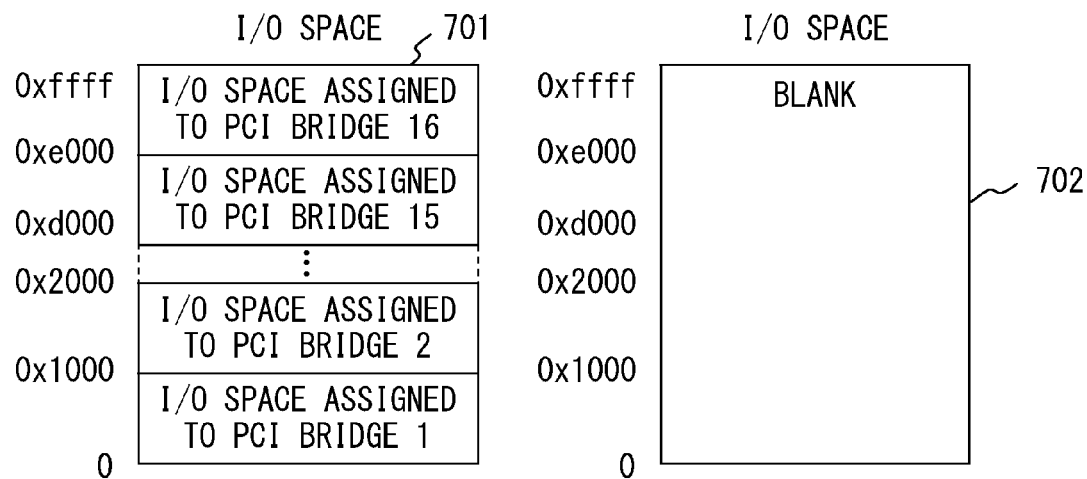
F I G. 7

I/O SPACE REQUEST SUPPRESSING METHOD FOR PCI DEVICE

CROSS-REFERENCE TO RELATED APPLICATION

This application is a continuation of PCT application of PCT/JP2007/000908, which was filed on Aug. 24, 2007.

FIELD

The present invention relates to a method of suppressing a request of I/O space by a PCI device.

BACKGROUND

At present, there is an interface standard adopted between a CPU and peripheral equipment developed by a PCI SIG (peripheral component interconnect special interest group) in many information processing devices.

They can be, for example, a "PCI local bus specification", a "PCI-X specification", a "PCI-Express specification", etc. The patent document 1 discloses the technology relating to a PCI bridge. The patent document 2 discloses the technology of a PCI bus system.

According to the specifications, for example, I/O space and memory space can be used as space to which a register to be used for control of a PCI device from a CPU is assigned.

The I/O space is used in accordance with old specifications based on the specifications of the architecture of a PC/AT compatible machine to secure the compatibility with a PC/AT (personal computer/advanced technology) compatible machine. Therefore, the upper limit of the size in which an I/O space can be assigned is limited to 64 KB.

For example, when there is a PCI bridge, the minimum assignment unit of the I/O space to the PCI bridge is 4 KB. Therefore, the upper limit of the number of PCI bridges to which the I/O space can be assigned is restricted to 16 (=64 KB/4 KB).

It is the restriction by the specification of the "PCI local bus specification, Revision 2.3".

Conventionally, a maximum of 32 PCI devices can be connected to one bus. However, there has recently been a decreasing number of PCI devices connectable to a PCI bridge to keep up with a higher transmission speed of PCI devices.

For example, with a bus of PCI-X 100 MHz, the number of connectable devices is 2, and with a bus of PCI-X 133 MHz, it is 1. In addition, under the specification of the PCI-Express the correspondence between the bridge and the device is one to one. In this case, the upper limit (16) of the number of bridges assignable to the I/O space is simply defined as the upper limit of the assignable devices.

In a large server system, there are a number of systems provided with a maximum of 128 PCI slots. However, if the above-mentioned restriction is applied as is, at most 16 PCI slots can be loaded.

Accordingly, a conventional system has to be loaded with a PCI device not requesting I/O space, or has to perform an operation by limiting the PCI devices to those operable in memory space without practically using any I/O space. In addition, there are only a few kinds of PCI devices not requesting I/O space, and it has been hard to configure a system only by PCI devices not requesting I/O space.

Thus, a PCI device requesting I/O space but capable of performing an operation without actually using I/O space, that is, a PCI device capable of performing an operation using I/O space or memory space (hereinafter referred to simply as a "PCI device"), has been proposed by various PCI device vendors.

However, the PCI device has the following problems.

For example, an operating system determines whether or not the PCI device is requesting the assignment of I/O space by checking whether or not there is a base address register requesting I/O space stored in a PCI configuration register provided in the PCI device.

Accordingly, any PCI device having a base address register requesting I/O space is supposed to request I/O space.

As a result, when I/O space cannot be assigned to a new PCI device due to insufficient I/O space to be assigned, there is no countermeasure other than disabling the PCI device by performing an error handling process, thereby requiring a special system for preventing the operating system from using the I/O space.

For Windows (registered trademark), an inf file as a system-defined file is used. Through the inf file, the operating system can be informed that the PCI device does not use I/O space. If it is determined that the PCI device does not use I/O space, the operating system ignores the presence, if any, of a base address register requesting the I/O space, and performs an operation by as signing only memory space without assigning I/O space to the PCI device.

For Linux, a driver not requesting I/O space is prepared for the PCI device.

However, for example, when Windows (registered trademark) is installed, the above-mentioned inf file is not included in CD-ROM etc. for installation. Therefore, the operating system cannot be informed through the inf file that the PCI device does not use I/O space.

Similarly, during the installation of Linux, a driver without using I/O space is not included. Therefore, the PCI device requires the assignment of I/O space during installation.

After all, since there are restrictions on the use of an inf file and a special driver without a request of I/O space, there is still the problem that an accessible PCI device cannot be effectively used although any of I/O space and memory space is utilized.

Patent Document 1: Japanese Laid-open Patent Publication No. 11-288400
Patent Document 2: Japanese Laid-open Patent Publication No. 2002-032324

SUMMARY

The present invention has been developed to solve the above-mentioned problems to provide a method for minimizing the restrictions on the number of available PCI devices although there are restrictions on the assignable size of I/O space.

To solve the above-mentioned problems, the arithmetic unit according to the present invention can be connected to a plurality of PCI devices, and can operate the PCI devices through I/O space or memory space by an operating system operable on the arithmetic unit. The arithmetic unit includes: a configuration information acquisition device for referring to a configuration information storage device storing configuration information about the PCI devices at a request from the operating system, and acquiring the configuration information; an available space determination device for determining according to the configuration information whether or not both I/O space and memory space are available to the PCI devices; and a configuration information notification device for notifying the operating system of the configuration information, and notifying that only memory space is available to the PCI devices when both I/O space and memory space are available to the PCI devices as a result of the determination by the available space determination device.

According to the present invention, when both I/O space and memory space are available to a PCI device, the configuration information notification device notifies the operating system that only the memory space is available to the PCI device.

As a result, since it is not necessary for the operating system to assign the I/O space to any PCI device other than the PCI device that uses only the I/O space, the use of the I/O space can be suppressed as much as possible.

Therefore, the present invention can provide a method for minimizing the restrictions on the number of available PCI devices although there are restrictions on the assignable size of I/O space.

BRIEF DESCRIPTION OF DRAWINGS

FIG. 3 is an example of a configuration of the PCI configuration register provided for the PCI device according to an embodiment of the present invention;

FIG. 4 is an explanatory view of a configuration of the base address register of the PCI configuration register provided for the PCI device according to an embodiment of the present invention;

FIG. 5 is an example of a configuration of the PCI device according to an embodiment of the present invention;

FIG. 6 is a flowchart of the process of the arithmetic unit according to an embodiment of the present invention; and FIG. 7 is an explanatory view of I/O space used by the arithmetic unit according to an embodiment of the present invention.

DESCRIPTION OF EMBODIMENTS

The embodiments of the present invention are described below with reference to FIGS. 1 through 7.

Figure 1:
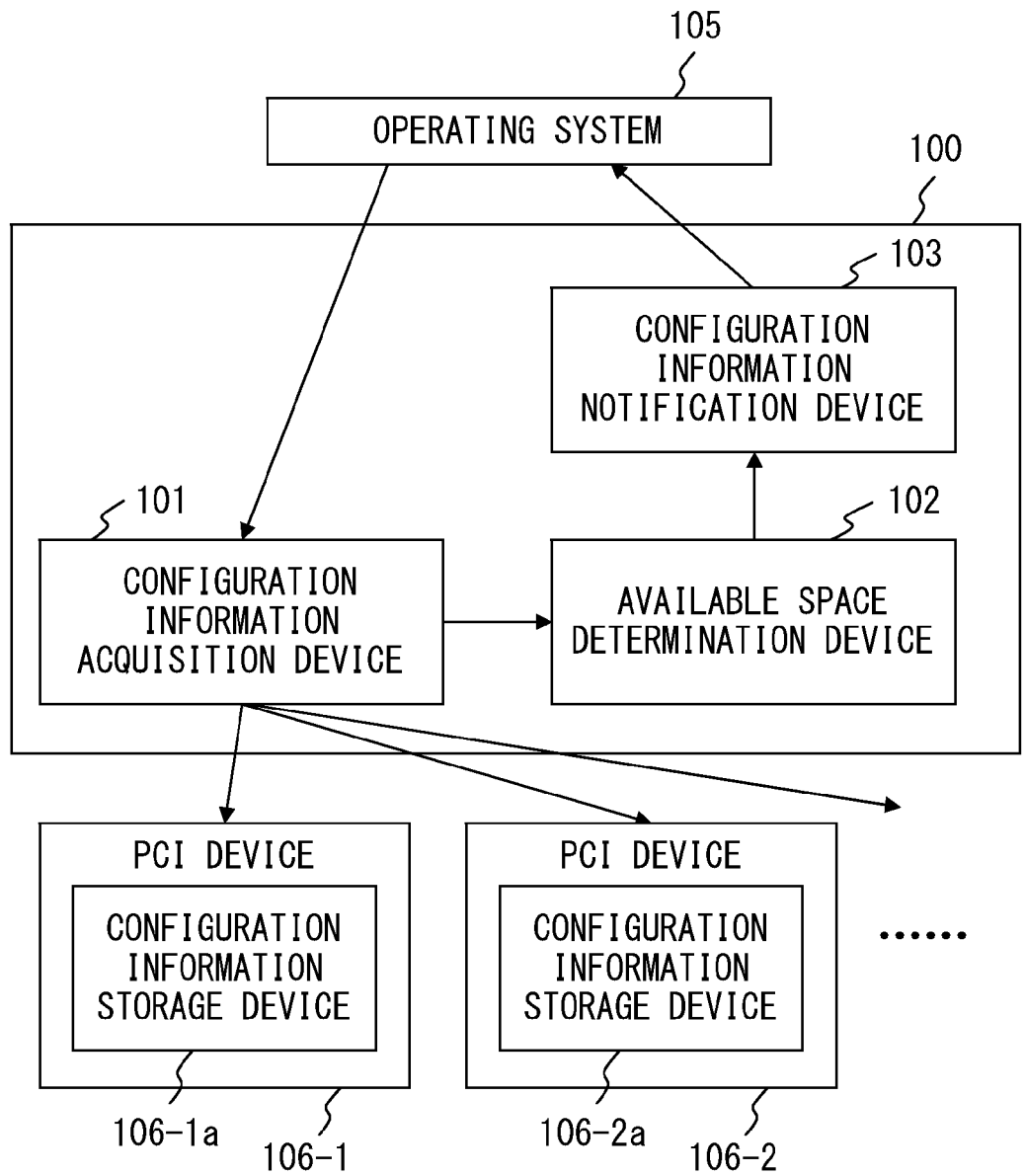
FIG. 1 is an explanatory view of the operation principle of the arithmetic unit according to an embodiment of the present invention.

FIG. 1 is an explanatory view of the operation principle of an arithmetic unit 100 according to an embodiment of the present invention.

As illustrated in FIG. 1, the arithmetic unit arithmetic unit 100 includes a configuration information acquisition device 101 for acquiring the configuration information about PCI devices 106-1, 106-2, . . . , an available space determination device 102 for determining available space to each PCI device; and a configuration information notification device 103 for notifying an operating system of the configuration information.

The arithmetic unit 100 performs an operation according to an operating system 105. For example, it is realized by a CPU (central processing unit), a chip set including the CPU, a mother board (system board) including the CPU, etc.

The above-mentioned CPU, chip set, and mother board include not only hardware but also a program operating on the hardware (for example, firmware, a micro-program, etc.).

The arithmetic unit 100 can also be connected to to a plurality of PCI devices 106-1, 106-2, . . . so that the arithmetic unit 100 can operate the PCI devices. When the PCI device requests I/O space, the I/O space is assigned to the PCI device. If the PCI device requests memory space, the memory space is assigned to the PCI device. If the PCI device requests both I/O space and memory space, the PCI device is assigned both of them. The arithmetic unit 100 accesses the PCI device through the assigned I/O space or memory space.

The configuration information acquisition device 101 acquires each piece of configuration information from configuration information storage devices 106-1a, 106-2a, . . . included in PCI devices 106-1, 106-2, . . . , respectively, in response to a request from the operating system. 105. Then, the configuration information notification device 103 notifies an available space determination device 102 of the configuration information.

The configuration information refers to, for example, all or a part of information in a PCI configuration register.

Upon receipt of a notification of the configuration information from the configuration information acquisition device 101, the available space determination device 102 refers to the configuration information, and determines whether or not both I/O space and memory space are available to the PCI device. Then, the available space determination device 102 notifies the configuration information notification device 103 of a determination result.

When the PCI device can use both I/O space and memory space, the configuration information notification device 103 issues a notification that the PCI device can use only memory space. In the present embodiment, the configuration information is changed to the data indicating that the PCI device can use only memory space, and notifies the operating system 105 of the data.

In the above-mentioned processes, upon receipt of the configuration information from each PCI device, the operating system 105 assigns the resources of I/O space or memory space according to each piece of condition, and is loaded with a necessary driver.

Since the PCI device requesting both I/O space and memory space is reported as a PCI device requesting only memory space to the operating system 105, the operating system 105 does not assign a resource of I/O space (assigns only memory space resources).

As a result, since a device other than a PCI device capable of using only I/O space does not use I/O space, the restrictions on the number of available PCI devices can be minimized by restricting the assignable size of I/O space.

Figure 2:
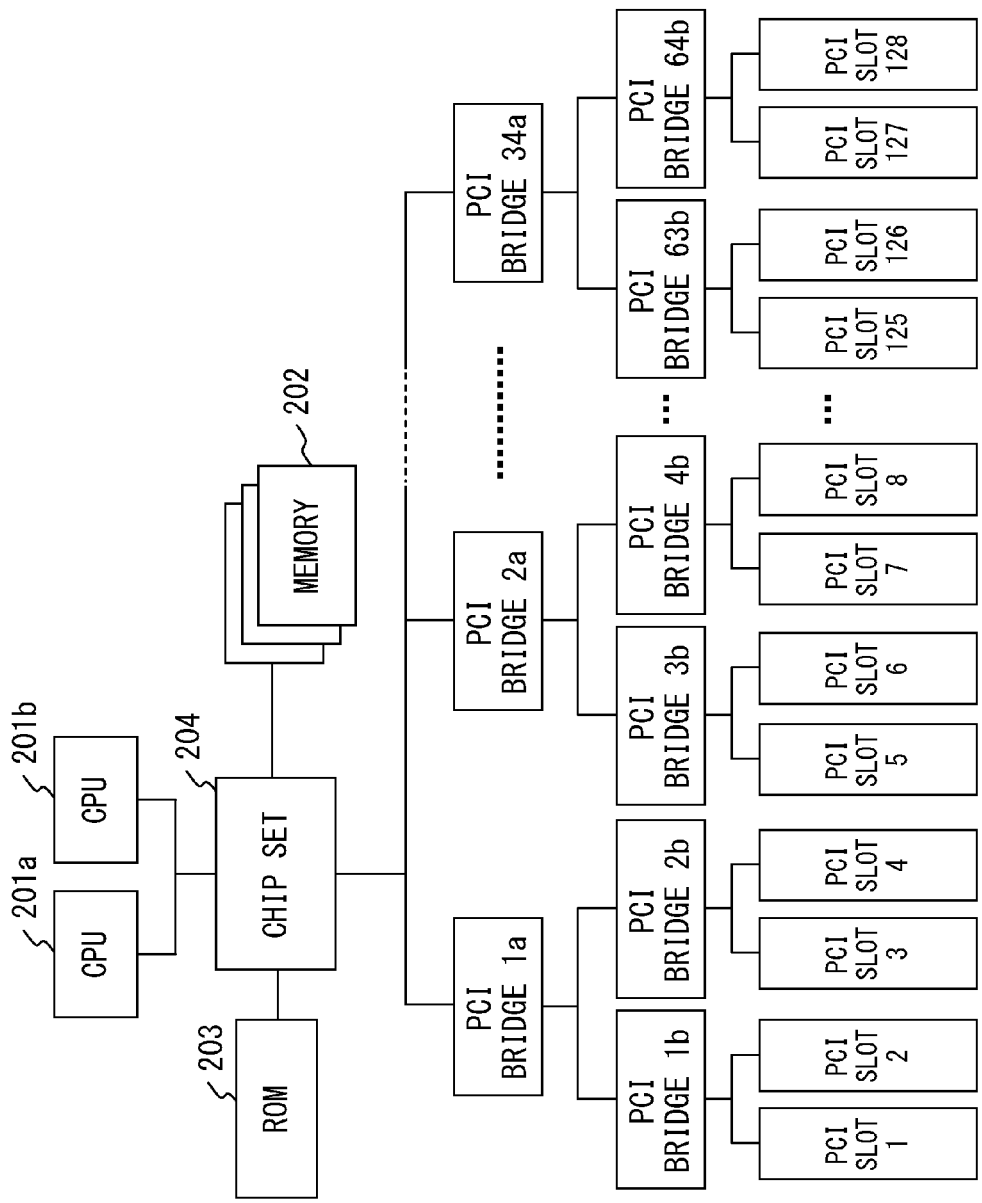
FIG. 2 is an example of a configuration of the arithmetic unit according to an embodiment of the present invention.

FIG. 2 is an example of a configuration of the arithmetic unit 100 according to an embodiment of the present invention.

As illustrated in FIG. 2, the arithmetic unit 100 includes CPUs 201a and 201b, memory 202 configured by volatile memory (for example, RAM (random access memory)), ROM (read only memory) 203 configured by non-volatile memory storing firmware etc., PCI bridges 1a through 34a, PCI bridges 1b through 64b subordinate to the PCI bridges 1a through 34a, PCI slots 1 through 128 for implementing the PCI devices subordinate to the PCI bridges 1b through 64b, and a chip set 204 for controlling the communications of the data between components.

The numbers of CPUs, PCI bridges, and PCI slots are exemplified, and not limited to the configuration illustrated in FIG. 2.

The CPUs 201a and 201b (hereinafter referred to generally as "CPUs 201") read firmware from the ROM 203, and store it in a storage unit provided in the CPU 201 or the chip set 204 but not illustrated in the attached drawings. Thus, the firmware (hereinafter referred to as "CPU firmware") is executed.

The CPU 201 reads the operating system 105 from an external storage device (for example, a magnetic disk device) not illustrated in the attached drawings, stores all or a part of the system in the memory 202, and performs a process at an instruction of the operating system 105.

For example, when the activation of the operating system 105 is completed, the operating system 105 instructs the CPU firmware to read the base address register of the PCI configuration register from the PCI device implemented in each of the PCI slots 1 through 128.

The CPU firmware reads the base address register from the PCI device implemented in each of the PCI slots 1 through 128 at an instruction of the operating system 105, and notifies the operating system 105 of the register.

In this case, if the PCI device requests both I/O space and memory space, it changes the base address register into the value indicating that the PCI device requests only the memory space, and notifies the operating system 105 of the request.

The operating system 105 refers to the notified base address register. If the PCI device requests I/O space, the system performs resource assignment of the I/O space to the PCI device. If the PCI device requests memory space, the system performs resource assignment of the memory space to the PCI device.

FIG. 3 is an example of a configuration of the PCI configuration register provided for the PCI device according to an embodiment of the present invention.

As illustrated in FIG. 3, a PCI configuration register 300 is provided with at least a vendor ID (0x00~0x15), a device ID (0x16x0x31), and a base address register (0x10~0x27).

A vendor ID is assigned to each vendor by the PCI SIG. A device ID is freely assigned by a manufacturer to uniquely identify a device.

A base address register stores a base address register (32 bits or 64 bits) indicating memory space and a base address register (32 bits or 64 bits) indicating I/O space.

The explanation of other data is omitted here because they have data configurations in accordance with, for example, "PCI local bus specification, revision 2.3".

FIG. 4 is an explanatory view of the base address register of the PCI configuration register provided for the PCI device according to an embodiment of the present invention.

A base address register 401 illustrated in FIG. 4 refers to memory space (when it has a 32-bit configuration).

The base address register 401 is configured by a memory space indicator (bit 0), a type (bits 1~2), prefetchability (bit 3), and a base address (bits 4~31).

The memory space indicator indicates that the register is used for memory space, and constantly stores 0. The type indicates an address range in which a memory block can be arranged. The prefetchability controls enabling and disabling prefetch.

A base address register 402 illustrated in FIG. 4 is a base address register indicating I/O space (when it has a 32-bit configuration).

The base address register 402 is configured by an I/O space indicator (bit 0), and a base address (bits 2~31).

The I/O space indicator indicates that the register is used for I/O space, and stores 1.

FIG. 5 is an example of a configuration of the PCI device according to an embodiment of the present invention.

A PCI device 500 illustrated in FIG. 5 includes a PCI configuration register unit 501 configured by the PCI configuration register 300 illustrated in FIG. 3, an MMIO (memory mapping I/O) register unit 502 configured by various registers assigned to memory space, an IO register unit 503 configured by various registers assigned to I/O space, and a control unit 504 for realizing predetermined functions such as a NIC (network interface card), an SCSI (small computer system interface), etc.

The CPU firmware accesses the PCI configuration register unit 501, the MMIO register unit 502, and the IO register unit 503 through the PCI bus.

Various registers configuring the MMIO register unit 502 (for example, an R/W instruction register etc.) are assigned to a predetermined address of memory space by the operating system 105. Various registers (for example, an I/O R/W instruction register etc.) configuring the IO register unit 503 are assigned to a predetermined address of I/O space by the operating system 105.

With the above-mentioned configuration, both I/O space and memory space are available to the PCI device 500 illustrated in FIG. 5 by storing the base address registers 401 and 402 in the base address register of the PCI configuration register 501.

FIG. 6 is a flowchart of the process of the arithmetic unit 100 according to an embodiment of the present invention.

In step S601a, for example, when an information processing device implementing the arithmetic unit 100 according to the present embodiment is powered up, the arithmetic unit 100 reads the operating system 105 from an external storage device not illustrated in the attached drawings, and an OS boot process is performed for storing the operating system 105 in the memory 202 in an executable state.

When the OS boot process is completed, the operating system 105 can be operated on the arithmetic unit 100. Then, the process of searching the PCI device described below is performed on all devices implemented in the information processing device.

In step S602a, the operating system 105 issues to the CPU firmware a read request for the vendor ID and the device ID of any device implemented in the information processing device.

On the other hand, in step S601b, upon receipt of a read request from the operating system 105, the CPU firmware acquires a vendor ID and a device ID from a specified PCI configuration address. Then, the CPU firmware notifies the operating system 105 of the acquired vendor ID and device ID.

In step S603a, the operating system 105 determines whether or not the PCI device is loaded at the specified PCI configuration address by the notified vendor ID and device ID. In the present embodiment, when the values of the vendor ID and the device ID read by the CPU firmware are not all 0 or all F, it is determined that the PCI device is loaded.

If the operating system 105 determines in step S603a that the PCI device is loaded at the PCI configuration address, then it sequentially issues to the CPU firmware a read request for the base address register of the PCI device for each of the base registers.

On the other hand, upon receipt of the read request from the operating system 105, the CPU firmware reads a base address register from the PCI configuration register of the PCI device.

In step S603b, the CPU firmware refers to the value of the bit 0 of each of the read base address registers. When the value of the bit 0 of the read base address register is "1", the CPU firmware passes control to step S604b.

If the value of the bit 0 of the read base address register is "0", the CPU firmware passes control to step S605b.

In step S604b, the CPU firmware changes the value of the base address register to "0 (All 0)". Then, the CPU firmware passes control to step S605b.

In step S605b, the CPU firmware notifies the operating system 105 of the base address register.

In step S604a, upon receipt of the notification of the base address register from the CPU firmware, the operating system 105 refers to the bit 0 of the base address register.

If the value of the bit 0 is "0", the operating system 105 determines that the PCI device requests memory space. If the value of the bit 0 is "1", the operating system 105 determines that the PCI device requests I/O space.

When the value of the base address register is "0 (All 0)" (for example, when it is changed to "0 (All 0)" in step S604*b*), the operating system 105 determines that the register does not request I/O space or memory space, and ignores the value.

When the searching process described above is performed on all devices implemented in the information processing device, the operating system 105 passes control to step S605*b*.

In step S605*b*, the operating system 105 performs the resource assignment of I/O space or the resource assignment of memory space on each PCI device according to a result of the searching process in steps S602*a* through S604*a* (in step S604*a*, the resource assignment of I/O space is performed on the PCI device determined as requesting I/O space, and the resource assignment of memory space is performed on the PCI device determined as requesting memory space).

In step S606*a*, the operating system 105 reads a corresponding driver for each PCI device from an external storage device etc. and stores it in an executable state in the memory 202 (loading a driver).

When the processes in steps S605*a* and S606*a* are completed on the implemented PCI device detected in the searching process in steps S602*a* through S604*a*, the operating system 105 passes control to step S607*a*, and the resource assigning process of I/O space or memory space is terminated.

In the processes above, the process in step S603*b* can be the processes in (1), (2), or (3) below.

(1) A specific vendor ID and device ID are registered in a storage device etc. in advance, and the process in step S603*b* is performed when they match all or a part of the vendor ID and the device ID read in step S601*b*.

(2) An upper PCI bridge (related I/O space) to the PCI device is referred to, and it is checked whether or not the PCI bridge has assigned I/O space to the PCI device. If I/O space has not been assigned yet (or when there are not sufficient areas to which I/O space is assigned), the process in step S603*b* is performed.

(3) The process in step S603*b* is performed when all base address registers of the PCI device are referred to, and a base address register requesting I/O space and memory space is included.

FIG. 7 is an explanatory view of I/O space used by the arithmetic unit 100 in an example of the configuration illustrated in FIG. 2.

For easier explanation, FIG. 7 illustrates I/O space when the PCI device 500 illustrated in FIG. 5 (that is, the PCI device in which both I/O space and memory space are available) is implemented for all PCI slots illustrated in FIG. 2.

I/O space 701 is a conventional example in which the present embodiment is not applied, and I/O space 702 is an example according to the present embodiment.

FIG. 2 is an example of a configuration when 64 PCI bridges are provided. When the PCI device 500 illustrated in FIG. 5 is implemented in the PCI slot under each of PCI bridges 1 through 64, each PCI bridge requests I/O space when the present embodiment is not applied.

For example, I/O space is assigned by 4 KB sequentially from the PCI bridge 1. However, since the assignable size of I/O space is 64 KB, the I/O space can be assigned only to the PCI bridges 1 through 16. The I/O space in this case is represented by the I/O space 701.

On the other hand, when the present embodiment is applied, the PCI device 500 illustrated in FIG. 5 is reported as requesting only memory space from the CPU firmware to the operating system 105 in the process in step S603*b*.

Therefore, when the PCI device 500 is implemented in all PCI slots under the PCI bridges 1 through 64, the operating system 105 performs resource assignment of only memory space to each PCI bridge (PCI device), but does not perform resource assignment of I/O space. the I/O space in this case is represented by the I/O space 702.

FIG. 7 is an explanatory view of an extreme example for comprehensibility. It is obvious that the present invention is not limited to the case illustrated in FIG. 7. When a PCI bridge requesting only I/O space is implemented in any of the PCI bridges 1 through 64, I/O space is assigned to the PCI bridge (PCI device).

As described above, the operating system 105 operating on the arithmetic unit 100 according to the present embodiment is recognized as requesting only memory space in the process in step S603*b* by the CPU firmware illustrated in FIG. 6. Therefore, I/O space is not assigned to the PCI bridge, but only memory space is assigned.

Therefore, the PCI device is assigned only memory space. As a result, the use of I/O space can be minimized, thereby minimizing the restriction on the number of available PCI devices although the assignable size of the I/O space is limited.

During the installation of the operating system 105, the PCI device 500 illustrated in FIG. 5 (PCI device in which both I/O space and memory space are available) can be used without using a special process or a driver, there by further improving the convenience to users.

What is claimed is:

1. An arithmetic unit which can be connected to a plurality of PCI devices and operate the PCI devices through I/O space or memory space by an operating system operable on the arithmetic unit, comprising:
    a configuration information acquisition device referring to a configuration information storage device storing configuration information about the PCI devices at a request from the operating system, and acquiring the configuration information;
    an available space determination device determining according to the configuration information whether or not both I/O space and memory space are available to the PCI devices; and
    a configuration information notification device notifying the operating system of the configuration information, and notifying that only memory space is available to the PCI devices when both I/O space and memory space are available to the PCI devices as a result of the determination by the available space determination device.

2. The unit according to claim 1, wherein
    upon receipt of a notification from the configuration information notification device that only memory space is available to the PCI device, the operating system does not assign I/O space, but assigns memory space only.

3. The unit according to claim 1, wherein
    a base address register stored in a PCI configuration register is used for the configuration information.

4. The unit according to claim 1, wherein
    a request to the configuration information acquisition device is issued when or immediately after the operating system is activated.

5. The unit according to claim 1, wherein
    the PCI device can be connected through a PCI bridge.

6. An information processing device capable of implementing a plurality of PCI devices and operating the PCI devices through I/O space or memory space by an operating system operable on an arithmetic unit of the information processing device, comprising:
- a configuration information acquisition device referring to a configuration information storage device storing configuration information about the PCI devices at a request from the operating system, and acquiring the configuration information;
- an available space determination device determining according to the configuration information whether or not both I/O space and memory space are available to the PCI devices; and
- a configuration information notification device notifying the operating system of the configuration information, and notifying that only memory space is available to the PCI devices when both I/O space and memory space are available to the PCI devices as a result of the determination by the available space determination device.

7. The device according to claim 6, wherein
the configuration information acquisition device, the available space determination device, and the configuration information acquisition device are provided for the arithmetic unit.

8. The device according to claim 6, wherein
upon receipt of a notification from the configuration information notification device that only memory space is available to the PCI device, the operating system does not assign I/O space, but assigns memory space only.

9. A method for suppressing a request for I/O space by a plurality of PCI devices which can be connected to an arithmetic unit and operated by an operating system operable on the arithmetic unit using any of I/O space and memory space, comprising:
- a configuration information acquiring process of referring to a configuration information storage device storing configuration information about the PCI devices at a request from the operating system, and acquiring the configuration information;
- an available space determining process of determining according to the configuration information whether or not both I/O space and memory space are available to the PCI devices; and
- a configuration information notifying process of notifying the operating system of the configuration information, and notifying that only memory space is available to the PCI devices when both I/O space and memory space are available to the PCI devices as a result of the determination in the available space determining process.

10. The method according to claim 9, wherein
upon receipt of a notification from the configuration information notification device that only memory space is available to the PCI device, the operating system does not assign I/O space, but assigns memory space only.

11. The method according to claim 9, wherein
the configuration information notifying process compares first identification information registered in advance in an identification information storage device for storing identification information for identification of a predetermined PCI device with second identification information registered in the configuration information, and notifies that only memory space is available to the PCI device when the comparison outputs a matching result.

12. The method according to claim 11, wherein
the identification information includes at least one of a vendor ID and a device ID.

13. The method according to claim 9 wherein
the configuration information notifying process refers to I/O space for a PCI bridge connected to an upper position of the PCI device, and notifies that only memory space is available to the PCI device when no PCI device is assigned to the I/O space.

14. The method according to claim 9, wherein
the configuration information notifying process refers to I/O space for a PCI bridge connected to an upper position of the PCI device, and notifies that only memory space is available to the PCI device when there is no sufficient I/O space to be assigned to a PCI device.

15. The method according to claim 9, wherein
the configuration information notifying process notifies that only memory space is available to the PCI device when the PCI device is provided with a base address register for a request of I/O space and a base address register for a request of memory space.

* * * * *